United States Patent
Feinstein

(10) Patent No.: US 10,031,657 B2
(45) Date of Patent: Jul. 24, 2018

(54) TILT-BASED VIEW SCROLLING WITH BASELINE UPDATE FOR PROPORTIONAL AND DYNAMIC MODES

(71) Applicant: David Y. Feinstein, Bellaire, TX (US)

(72) Inventor: David Y. Feinstein, Bellaire, TX (US)

(73) Assignee: INNOVENTIONS, Inc., Houston, TX (US)

( * ) Notice: Subject to any disclaimer, the term of this patent is extended or adjusted under 35 U.S.C. 154(b) by 295 days.

(21) Appl. No.: 15/130,485

(22) Filed: Apr. 15, 2016

(65) Prior Publication Data

US 2016/0231895 A1    Aug. 11, 2016

Related U.S. Application Data

(63) Continuation of application No. 14/873,448, filed on Oct. 2, 2015, now Pat. No. 9,348,435, which is a
(Continued)

(51) Int. Cl.
*G09G 5/00* (2006.01)
*G06F 3/0485* (2013.01)
(Continued)

(52) U.S. Cl.
CPC ........ *G06F 3/0485* (2013.01); *E21B 17/1028* (2013.01); *E21B 17/1078* (2013.01);
(Continued)

(58) Field of Classification Search
CPC ........ G06F 3/0485; G06F 3/0346; G06F 3/03; G06F 3/017; G06F 2200/1637
See application file for complete search history.

(56) References Cited

U.S. PATENT DOCUMENTS 5,703,623 A   12/1997  Hall et al.
5,874,941 A   2/1999   Yamada
(Continued)

FOREIGN PATENT DOCUMENTS

EP    1814019 A2    8/2007
EP    1290672 B1    1/2008

OTHER PUBLICATIONS

Innoventions, Inc., RotoView Technology White Paper, Aug. 2013, 6 pages, http://www.rotoview.com/white_paper.htm.
(Continued)

*Primary Examiner* — Vijay Shankar

(57) ABSTRACT

The present invention provides systems and methods for tilt-based scrolling of a magnified contents view on a mobile device with a relatively small screen display. The user controls the scrolling by changing the device's tilt relative to a baseline tilt. The scrolling control can follow a Proportional Scroll mode, where the relative tilt directly controls the screen position over the contents view, or a Dynamic Scroll mode where the relative tilt controls the scrolling speed. The present invention obtains a criterion for automatically selecting the best scrolling mode when the dimensions of the contents view change. The baseline tilt is updated when the screen display reaches an edge of the contents view to eliminate the creation of a non responsive range of tilt changes when the user changes tilt direction during Proportional Scroll mode, and to return the current tilt of the screen display to an optimal viewing condition during Dynamic Scroll mode.

33 Claims, 12 Drawing Sheets

Related U.S. Application Data continuation of application No. 14/340,476, filed on Jul. 24, 2014, now Pat. No. 9,181,760.

(60) Provisional application No. 61/858,603, filed on Jul. 25, 2013.

(51) Int. Cl.
*E21B 17/10* (2006.01)
*E21B 47/12* (2012.01)
*E21B 47/14* (2006.01)
*G06F 3/0346* (2013.01)
*G06F 3/01* (2006.01)
*G01B 21/22* (2006.01)
*G06F 3/03* (2006.01)
*G06F 1/16* (2006.01)
*H04L 29/08* (2006.01)

(52) U.S. Cl.
CPC ............ *E21B 47/122* (2013.01); *E21B 47/14* (2013.01); *G01B 21/22* (2013.01); *G06F 1/1694* (2013.01); *G06F 3/017* (2013.01); *G06F 3/03* (2013.01); *G06F 3/0346* (2013.01); *H04L 67/02* (2013.01); *G06F 2200/1637* (2013.01)

(56) References Cited

U.S. PATENT DOCUMENTS

| | | | |
|---|---|---|---|
| 6,201,554 B1 | 3/2001 | Lands | |
| 6,288,704 B1 | 9/2001 | Flack et al. | |
| 6,347,290 B1 | 2/2002 | Bartlett | |
| 6,466,198 B1 | 10/2002 | Feinstein | |
| 6,567,101 B1 | 5/2003 | Thomas | |
| 6,624,824 B1 | 9/2003 | Tognazzini et al. | |
| 6,765,553 B1 | 7/2004 | Odamura | |
| 6,798,429 B2 | 9/2004 | Bradski | |
| 6,933,923 B2 | 8/2005 | Feinstein | |
| 7,667,686 B2 | 2/2010 | Suh | |
| 8,175,798 B2 | 5/2012 | Orr et al. | |
| 8,381,102 B1 | 2/2013 | Scholler | |
| 8,423,076 B2 | 4/2013 | Kim et al. | |
| 8,645,871 B2 | 2/2014 | Fong et al. | |
| 8,866,741 B2 | 10/2014 | Cho et al. | |
| 8,890,898 B2 | 11/2014 | Tsai et al. | |
| 9,181,760 B2 | 10/2015 | Feinstein | |
| 9,348,435 B2* | 5/2016 | Feinstein | G01B 21/22 |
| 9,459,705 B2* | 10/2016 | Matas | G06F 3/0485 |
| 2006/0164382 A1 | 7/2006 | Kulas et al. | |
| 2014/0267441 A1 | 9/2014 | Matas et al. | |

OTHER PUBLICATIONS

RotoView by Innoventions, Inc., Smart Scroll Technology for Smartphones and Other Handheld Devices, http://www.rotoview.com, Aug. 5, 2013.

David Y. Feinstein, A View-Navigation System for Hand-Held Portable Display, Information Display, vol. 19, No. 7, July 2003, 4 pages.

* cited by examiner

TILT-BASED VIEW SCROLLING WITH BASELINE UPDATE FOR PROPORTIONAL AND DYNAMIC MODES

CROSS-REFERENCE TO RELATED APPLICATIONS

This application is a continuation of U.S. application Ser. No. 14/873,448 filed Oct. 2, 2015, which is a continuation of U.S. application Ser. No. 14/340,476 filed Jul. 24, 2014, now U.S. Pat. No. 9,181,760, which claims the benefit of provisional patent application Ser. No. 61/858,603, filed Jul. 25, 2013, by the present inventor. The entire disclosures of each of these prior applications are incorporated herein by reference.

STATEMENTS REGARDING FEDERALLY SPONSORED RESEARCH OR DEVELOPMENT

Not applicable.

REFERENCE TO A MICROFICHE APPENDIX

Not applicable

BACKGROUND OF THE INVENTION

1. Field of the Invention

The disclosed embodiments relate generally to electronic devices with a display operable to scroll a virtual display of contents which may be larger than the actual size of the device's physical display.

2. Description of the Related Art

Hand held devices with a small physical display must often show a virtual stored or computed contents display that is larger than the screen view of the physical display. Only a portion of the virtual display can be shown at any given time within the screen view, thus requiring an interactive process of view navigation that determines which particular portion of the virtual display is shown. This process must allow the user to scroll the entire virtual display. Various methods have been used to control view navigation, including keyboards, joysticks, touch screen gestures, voice commands, rotational and movement sensors, and visual gestures.

Today's most popular user interface in hand held devices is the touch screen display. The touch screen display enables the user to perform single-touch and multi-touch gestures (also called "touch commands") to navigate (or "scroll") the display as well as to activate numerous functions and links. The versatility of these touch screen gestures caused the gradual disappearance of traditional means of view navigation like keyboards and joysticks.

As a result, most contemporary mobile devices employ the Flick and the Drag (panning) touch screen gestures to control the view navigation process. These gestures normally require cumbersome, two-hand operation as the user holds the device with one hand and performs the gesture with the other. These touch gestures may cause unhealthy ergonomic strains on users, particularly when the user attempts to perform a single hand Flick gesture. Even if the user is somehow able to perform touch commands with only one hand, the fingers that touch the screen are still always in the way, obstructing the screen view. Touch screen gestures often cause unintended activation of links that may be present on the screen during scrolling, and result in fingerprints and dirt being left on the screen. When the virtual display size is much larger than the screen size, many repeated touch screen commands are necessary for scrolling the contents.

Various methods have been proposed as an alternative to touch screen commands for performing screen scrolling. A promising alternative is a view navigation system based on motion, which allows the users to scroll the display using only one hand and without obscuring the screen view by the fingers that are used for touch commands. In this disclosure, the term 'motion' refer to device motion that can be translated into a rotation (or tilt) change relative to a given baseline. This view navigation system of a mobile device may utilize a set of rotation and movement sensors like the gyroscope, tilt sensor, camera tilt detector, magnetic sensor, Infra Red multiple camera rotation sensor, and any combination of these sensors.

An early motion-based view navigation system is disclosed in my U.S. Pat. Nos. 6,466,198 and 6,933,923 which are incorporated by reference herein in their entirety. These patents have been commercialized under the trade name "RotoView" and their development has been chronicled online at http://www.rotoview.com. The "RotoView" system is well adapted to navigate the device's screen view across an arbitrarily large contents view. Among other features, "RotoView" introduced the fixed mode and navigation (e.g. scrolling) mode so that the screen view does not continue to follow the tilt changes when the view navigation system is brought back to the fixed mode at the end of the scrolling mode. Another "RotoView" feature is its ability to provide various fine and coarse modes of scrolling. At the fine scrolling mode, relatively large tilt (or "orientation") changes cause only a small amount of scrolling. Conversely, at the coarse scrolling mode, relatively small tilt changes cause large amounts of scrolling.

A motion-based view navigation system works in a closed control loop between the user and the device, where the user iterates the rotational motion in response to the actual scrolling occurring on the screen. If a motion-based scrolling device is first rotated beyond the edge of the contents view and then rotated back, the user experiences an undesired range of no response to the back rotation. If the rotation beyond the edge is significant, the undesired non-responsive range of rotation is quite large, during which the closed control loop between the user and the device is temporarily broken, as the user perceives no responses while changing the tilt of the device.

It should be noted that the user gains the best viewing experience when the screen surface is held perpendicular to her eyes. An often encountered challenge in motion-based view scrolling system is the viewing quality experienced during the tilting of the device, when the device is held at an oblique angle to the line of sight.

Therefore, it would be desirable to provide methods and systems that can reduce or eliminate the above deficiencies and improve the user's experience during motion-based view scrolling. Such methods should also reduce the cognitive burden on the user and produce a more efficient user interface that is intuitive and easy to use.

BRIEF SUMMARY OF THE INVENTION

The present invention provides a motion-based view scrolling system that employs two selectable scrolling modes when responding to the device rotation. In the first mode, the system sets the screen view position over the contents view directly from the amount of the rotation from the initial tilt baseline locked when the scrolling process started. This mapping between the relative tilt to the scrolling distance is typically proportional. We will refer in this application to this mode of view navigation as Proportional Scroll mode. The Proportional Scroll uses a preset rotation range that allows full scrolling of the contents view from edge to edge. The second scrolling mode uses the relative rotation changes to dynamically control the speed of scrolling, as taught by my RotoView patents cited above. We will refer in this application to this mode of view navigation as Dynamic Scroll mode.

When the magnification of the contents view is relatively small, the Proportional Scroll provides a convenient view navigation experience. Accurate rotation sensors like the gyroscope or camera allow the device to use a small rotation range (e.g. an angle of 30° degrees) to scroll the entire contents view. However, when the magnification becomes large, the Proportional Scroll mode forces the user to rotate the device across a wide angle range in order to cover the entire contents view. This may require the user to look at the screen at a sharply oblique direction, which reduces the quality of image perception and the readability of the displayed information. While the rotation range can be lowered in order to allow more scrolling for less rotation, the scrolling accuracy is reduced and becomes less stable when a small rotation cause the display to scroll a large amount of the stored contents.

The user gains the best viewing experience when the screen surface is held perpendicular to her eyes. Since Dynamic Scroll uses rotation changes to determine the speed and direction of the scroll, the device is returned to its initial orientation at the end of the scroll. As the user is likely to start the scrolling process when the device is held perpendicular to the line of sight in order to maximize the viewing convenience, the device is returned to an optimal viewing condition at the end of the scroll. Hence Dynamic Scroll is very useful when the contents view is highly magnified. Since Proportional Scroll mode and Dynamic Scroll mode have weaknesses and advantages, it is important that the mode selection will be optimal, providing an intuitive and easy to use view navigation.

In accordance with some embodiments, a computer-implemented method is performed on a portable computing device with a display and a motion sensor. The computer-implemented method navigates the contents screen based on the movements of the device and automatically selects the Proportional Scroll mode when the screen magnification is below a certain control value. When the screen magnification is above the control value, the computer-implemented method selects the Dynamic Scroll mode.

In accordance with some embodiments, the selection of the best scrolling mode for the horizontal direction may be different than the best scrolling mode selection for the vertical scrolling direction.

In accordance with some embodiments, the computer-implemented method seeks to minimize the non-responsive range of rotation when the scrolling reaches the edge of the contents view.

Thus, portable computing devices with display and motion sensors are provided with more efficient and convenient methods for scrolling the display based on the device motion. Such method and interfaces may enhance or replace conventional scrolling methods.

The details of various embodiments of the invention are set forth in the accompanying drawings and descriptions below.

BRIEF DESCRIPTION OF THE SEVERAL VIEWS OF THE DRAWINGS

For a better understanding of the aforementioned embodiments of the invention as well as additional embodiments thereof, reference should be made to the Detailed Description of the invention, in conjunction with the following drawings. In the drawings, like reference numerals designate corresponding elements, and closely related figures have the same number but different alphabetic suffixes.

DETAILED DESCRIPTION OF THE INVENTION

Hand held electronic devices typically have small screens and often need to show information contents that are larger than the size of their displays. They employ a contents view (also called "virtual display") which is stored in the device memory, while a part of the virtual display is shown in the screen view (also called "physical display"). In many systems, the contents view may be dynamically downloaded to the device (e.g. from servers connected via the internet or from externally connected local devices) so that at various times only a part of the contents view is actually stored in the device. In other situations, the contents may be programmatically updated or selectively loaded from local memory causing the contents view to change. The operator of the electronic device must be able to scroll the screen view over the contents view. It is important that the screen view navigation will be intuitive and easy to use.

Figure 1:
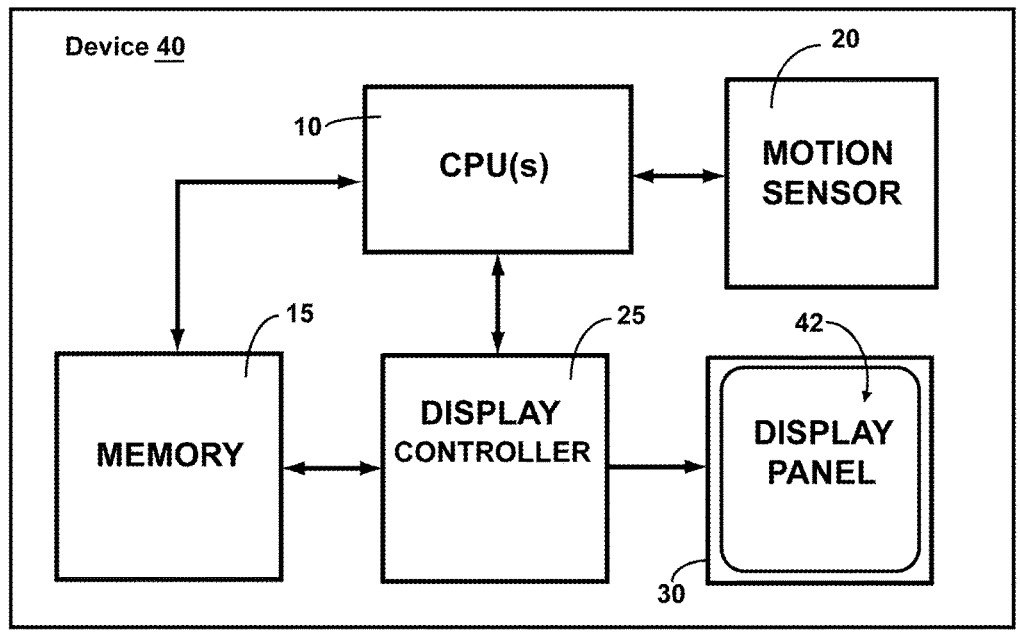
FIG. 1 is a block diagram illustrating an electronic device having a screen and motion-based view navigation in accordance with some embodiments.

FIG. 1 discloses an electronic device 40 in accordance to some embodiment of the present invention. The processor 10 provides the processing and control means required by the system, and it comprises one or more Central Processing Units (CPU). The CPU(s) in small electronic devices are often referred to as the microprocessor or micro-controller. The processor 10 uses the memory subsystem 15 for retaining the executable program, the data and the display information. A motion sensor system 20 interfaces with the processor 10 to provide ballistic data relating to the movements and rotations (tilt changes) of the device made by the user. The ballistic data can be used by the micro-controller to scroll (or navigate) the screen view 42 over the contents view.

A display controller module 25 controls the display panel module 30 in accordance with a program executed by the processor 10 and further interfaces with the memory subsystem 15 for accessing the contents view. The processor 10 determines which portion of the contents view is shown in the screen view 42. The display controller 25 may include local graphic memory resources. The display panel module may be equipped with touch interface to receive user's touch gestures. In such embodiments the display controller 25 provides the processor 10 with the touch screen gestures performed by one or more fingers on the display panel.

The motion sensor 20 detects rotational movements (or tilt gestures) along at least two generally perpendicular axes to measure changes in the horizontal and vertical tilt of the device relative to a baseline tilt captured at the start of the scrolling. The tilt changes are used by the processor 10 to determine the amount and direction of the scrolling of the screen view 42 over the contents view.

There are many types of motion sensors, including gyroscopes, cameras, accelerometers, magnetic, mechanical, background radio direction sensors, and more. Camera rotation sensors are based on one or more cameras that are mounted on the device 40 and associated with vision analysis to determine movements and rotations. Such camera sensor system may operate on the visible light range or on the infra red range of the spectrum. The motion sensor system may comprise an assembly of one or more sensors of different types, with special "sensor fusion" algorithm designed to improve the accuracy. Often, the motion sensor 20 includes built in computing elements to perform the 'fusion' algorithm. For example, a 6-degree-of-freedom sensor, which comprises a combination of a 3-axis accelerometer and 3-axis gyroscope can be used to distinguish between rotational and movement data and provide more precise view navigation. It can also use accelerometer data to compensate for a gyroscope drift. Complex sensors are useful but are not a must for implementing the present invention. The embodiments described here can be implemented with all rotation sensors.

To further reduce the overall system cost, the implementation can be made using only a single low-cost tri-axis accelerometer (also known as a gravity sensor or a G-sensor). This sensor is available in most modern hand held devices. In such an implementation, the acceleration readings along the X, Y, Z axes are converted into rotational readings along two perpendicular axes, e.g. the device's roll and pitch axes. It is well known in the art how to perform such a conversion, providing reasonable accurate roll and pitch results when the device has no lateral movements and the accelerometer resolves only the gravity of Earth. However, we have found that intuitive lateral movements in such a configuration are converted to virtual rotations. For example, lateral movement to the right may be translated to a roll axis rotation to the right. These lateral movements are still very useful to navigate the screen view because the scrolling process works in a closed control loop. This loop includes the user that moves the device, the translation of device lateral movements into virtual tilt changes, and the observed view navigation. Thus the user may combine lateral and rotation movements to scroll to the target area of the contents view.

The motion sensor 20 can be used to detect movement or rotation commands to activate and deactivate motion-based scrolling operation, as described in my "RotoView" patents cited above.

It should be apparent to a person familiar in the art that many variants of the block elements comprising the block diagram of FIG. 1 can be made, and that various components may be integrated together into one or more VLSI chips. The processor 10 can optionally access additional user interface resources such as a voice command interface and a keyboard/joystick interface. Another interface resource may be a visual gesture interface, which detects a remote predefined visual gesture (comprising predefined movements of the hand, the fingers or the entire body) using a camera or other capture devices.

Figure 2:
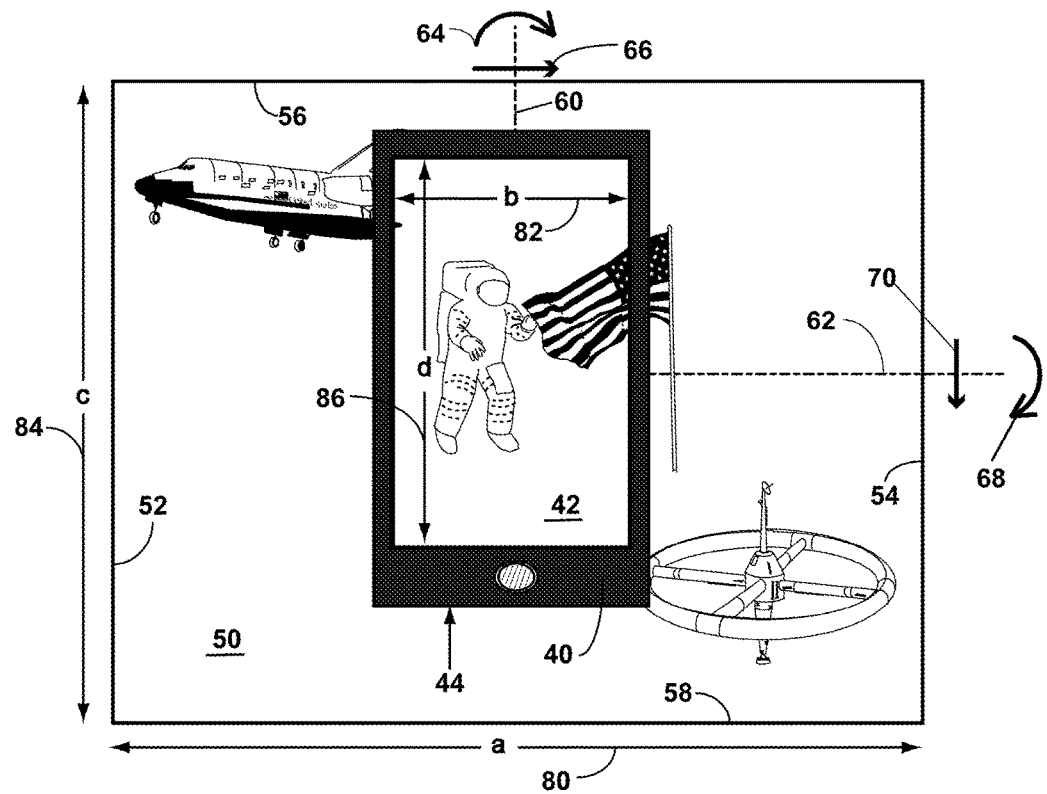
FIG. 2 illustrates the relation between the screen view of the device and the stored contents view for a motion-based view navigation.

FIG. 2 shows the geometric relation between the screen view 42 of the electronic device 40 and the contents view 50. The view navigation process determines which part of the contents view 50 is shown at the screen view 42, thus resulting in the scrolling of the contents. The user's three-dimensional tilt and movements of the hand held device 40 are generally projected into tilt changes relative to a baseline tilt along one or two generally perpendicular main axes placed on the surface of the display. These tilt changes control the actual horizontal and vertical scrolling. Any arbitrary scrolling of said contents view 50 can be decomposed into a horizontal scrolling component and a vertical scrolling component. In many instances in this application we choose to describe scrolling examples and processes along a single main axis for the sake of clarity, with the understanding that the same discussion is also relevant to the other main axis.

Borrowing from Avionics terminology, we say that axis 60 is set along the roll axis of the device 40 and axis 62 is set along the pitch axis of the device. Roll rotations cause changes in the main horizontal direction (also referred to as the "X" direction), while pitch rotations cause changes in the main vertical direction (also referred to as the "Y" direction). In such arrangement the scrolling is determined directly from the roll and pitch rotations, so that any tilt changes along the axis perpendicular to the plane of the screen view (yaw axis) may be ignored or used for optional user commands like zooming or control functions.

Various other techniques to translate absolute tilt changes and/or movements in real three dimensional space onto the two dimensions of the screen view are possible, and they can be employed with the present invention. In some embodiments, the sensor may not be aligned with the plane of the screen 42 so the sensor pitch, roll and yaw are mapped into the horizontal and vertical axes for scrolling.

Referring to FIG. 2, the device uses the first rotation axis 60 set along the roll axis of the device to translate the device's tilt changes along arrow 64 into rightwards horizontal scrolling of the screen view 42 over the contents view 50. Similarly, the second rotation axis 62 set along the pitch axis of the device to translate the device's tilt changes along arrow 68 into downwards vertical scrolling. I call this translation of rotation direction to scrolling direction "Mirror Style" as it mimics the change of a mirror view when it is rotated along arrows 64 and 68. Some users may prefer a reversed response, in which rotating the device along arrow 64 will cause leftwards horizontal scrolling, and rotation along arrow 68 will cause upwards vertical scrolling. I call that translation of scrolling direction "Window Style". Device settings allow the user to select his preferred style of scrolling direction.

The Motion-based view navigation systems may respond to lateral movements. When using a complex 6-degree-of-freedom sensor that includes an accurate gyroscope, it is possible to use only the gyroscope rotational data for scrolling control and ignore the lateral movement data. When using a low-cost solution with only a tri-axis accelerometer as described above, arrow 66 represents horizontal lateral movement that may be used to scroll the screen view to the right. Similarly, arrow 70 represents vertical lateral movement that may be used to scroll the screen view down.

When the entire contents view is shown in the screen view, we say that the contents view is not magnified (or that it is zoomed out). When the screen view shows only a portion of the contents view during the view navigation process (scrolling), we say that the contents view is magnified (or zoomed-in). The horizontal magnification is defined as the ratio MagX=a/b of the width (a) 80 of the contents view divided by the width (b) 82 of the screen view. Similarly, the vertical magnification is defined as the ratio MagY=c/d of the height (c) 84 of the contents view divided by the height (d) 86 of the screen view. Because the screen view 42 and the contents view 50 are generally represented by bounding rectangles that are often not similar, the horizontal magnification and vertical magnification are usually different. In cases where the contents view is dynamically downloaded to the device or changed programmatically during the scrolling operation, the magnification value changes in response to changes in the geometry of the changing contents view.

The device's tilt changes along the horizontal direction (e.g. around the roll axis 60) are measured relative to a horizontal baseline tilt of the device taken at the start of the scrolling. The device's tilt changes along the vertical direction (e.g. around the pitch axis 62) are measured relative to a vertical baseline tilt of the device taken at the start of the scrolling. Throughout this application we define tilt changes or rotation changes performed by the user in order to scroll the device as relative tilts. The relative horizontal tilt is defined as the current horizontal tilt of the device minus the horizontal baseline tilt. The relative vertical tilt is defined as the current vertical tilt of the device minus the vertical baseline tilt.

The scrolling controller can set the screen view position over the contents view directly from the relative tilt. To achieve this, each screen position on the contents view is mapped to a certain relative tilt value. This mapping is often proportional so that the current screen position at the start of scrolling is naturally mapped to zero relative tilt, and the screen position at the edges of the contents view are mapped to max and min values within the relative tilt range. This is why we refer to this mode of view navigation as Proportional Scroll mode. The Proportional Scroll must use a preset rotation range that allows full scrolling of the contents view from edge to edge. For example, the contents view 50 of FIG. 2 may be assigned a rotation range of 30° for the horizontal scrolling from the left edge 52 to the right edge 54, and a rotation range 20° for the vertical scrolling from the top edge 56 to the bottom edge 58.

Figure 3A:
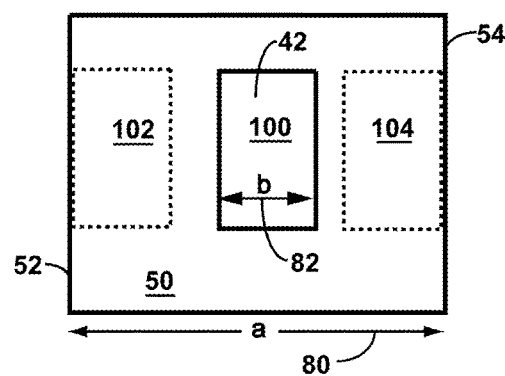
FIG. 3A outlines screen view positions over the contents view during an example of horizontal scrolling during the Proportional Scroll mode in accordance with one embodiment of the invention.
Figure 3B:
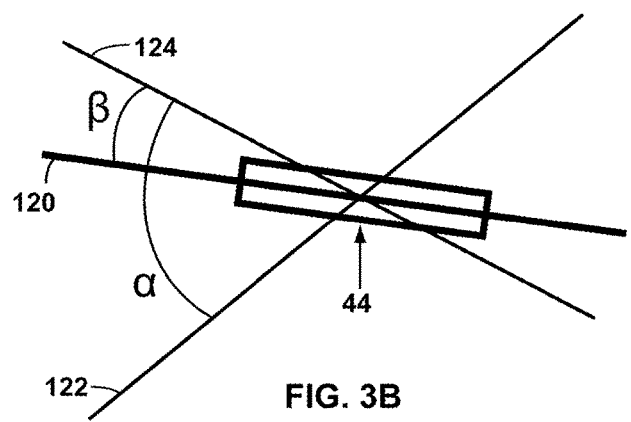
FIG. 3B illustrates the roll baseline and the tilt rotation lines along the roll axis for the example of FIG. 3A.
Figure 3C:
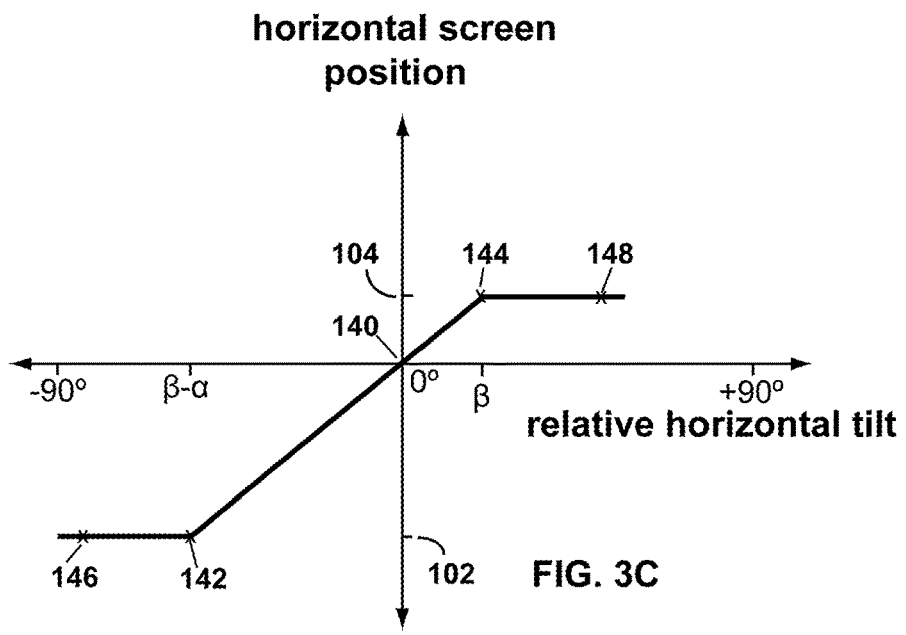
FIG. 3C depicts a graph showing the screen view horizontal position in response to the tilt along the roll axis relating to the example of FIG. 3A.

FIGS. 3A-3C illustrate a horizontal Proportional Scroll example taken in response to the device rotation around the roll axis 60. Vertical Proportional Scroll is similar to the horizontal scrolling so that the horizontal example is fully applicable to the issues presented with vertical Proportional Scroll.

FIG. 3A illustrates three screen view positions over the contents view 50 during the horizontal Proportional Scroll example. At the start of the scrolling process, the screen view is placed at an arbitrary screen position 100. When the device is tilted counter-clockwise along the roll axis 60 it reaches screen view position 102 at the left edge 52 of the contents view 50. When the device is tilted clockwise along the roll axis it reaches screen view position 104 at the right edge 54 of the contents view. Note that this relation between tilt direction to the scrolling direction follows the "Mirror Style" and can be reversed if the "Window Style" is chosen.

FIG. 3B illustrates the horizontal rotations during the horizontal Proportional Scroll of FIG. 3A as seen from the bottom edge view 44 of the device. The arbitrary tilt of the device 40 along the roll axis at the start of the Proportional Scroll example is captured as the horizontal baseline 120. The device is tilted to line 122 relative to the horizontal baseline 120 to cause the screen view 42 to scroll to position 102 at the left edge 52 of the contents view. Similarly, the device is rotated to line 124 to scroll the screen view to screen position 104 at the right edge 54 of the contents view. The angle β formed between lines 124 and 120 indicates the relative horizontal tilt needed to scroll from initial screen position 100 to the screen position 104 at the right edge of the contents view. The angle α formed between lines 122 and 124 defines the horizontal rotation range during the Proportional Scroll mode. In some embodiments the device allows the user to set the rotation range to a desired value. In other embodiments the horizontal and vertical rotation ranges can be determined automatically based on optimal viewing criteria. Since the user gains the best viewing experience when the screen surface is perpendicular to her eyes, it is desirable to set it to the lowest value that still allows convenient control by the user. When the horizontal and/or vertical magnifications are large, setting a low value for the rotation range requires that very small rotations are translated to large scrolling distances. As a result, scrolling under these conditions is less smooth and sometimes unpleasantly jumpy. Some embodiments may provide filtering for the sensor data to reduce the jumpy behavior of the rotation measurements. One needs to be aware that strong filtering tends to cause a noticeable delay in the scrolling response.

FIG. 3C depicts a graph showing the horizontal screen position relative to the relative horizontal tilt for the Proportional Scroll example of FIG. 3A. When the Proportional Scroll begins, the current horizontal tilt of the device is captured as the horizontal baseline. This initial horizontal tilt has a relative horizontal tilt equal to 0° at the graph origin 140. The graph origin 140 also corresponds to the initial screen position 100 in FIG. 3A. Following the "Mirror Style" setting of this example, the relative horizontal tilt increases when the device is rotated clockwise and it decreases when the device is rotated counter clockwise. Notice that the horizontal screen position is linearly related to the relative horizontal tilt between graph points 142 and 144. At graph point 142, the device is tilted to line 122 of FIG. 3B and the screen view reaches screen position 102 at the left edge 52 of the contents view 50. If the relative horizontal tilt is further decreased (by continuing to rotate the device counter clockwise) until graph point 146, the screen view position remains at 102 as it is stopped at the left edge 52 of the contents view. If the user wants to rotate clockwise back from graph point 146, there is a non-responsive range of rotation until graph point 142 where no scrolling occurs. The screen view 42 starts to scroll away from the left edge 52 only when the relative horizontal tilt goes above $\beta-\alpha$. This problem of having non-responsive range of rotation is resolved by the embodiments described in FIG. 9-14.

At graph point 144, with a relative horizontal tilt equal to $\beta$, the device's horizontal tilt reaches line 124 of FIG. 3B, corresponding to screen view position 104 at the right edge 54 of the contents view. The screen view position remains at 104 when the device is further rotated clockwise beyond the line 144 to reach graph point 148. Similarly to what was observed at the left edge, there is a non-responsive range of rotation from graph points 148 to 144.

Figure 4A:
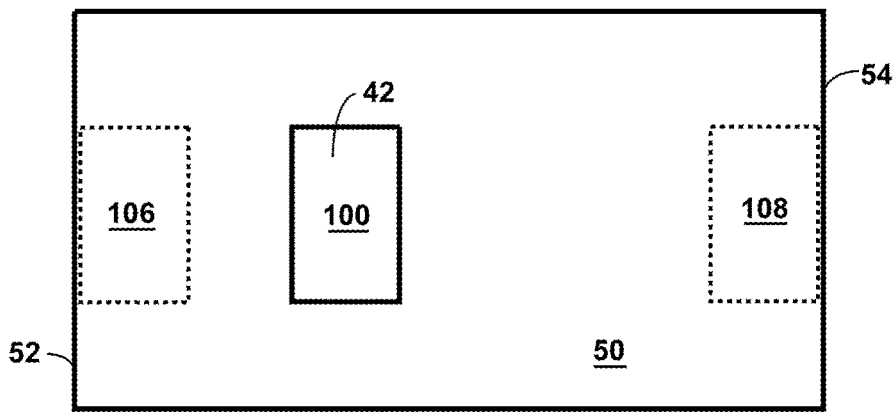
FIG. 4A outlines screen view positions over the contents view during an example of a horizontal Dynamic Scroll mode in accordance with some embodiments of the present invention.
Figure 4B:
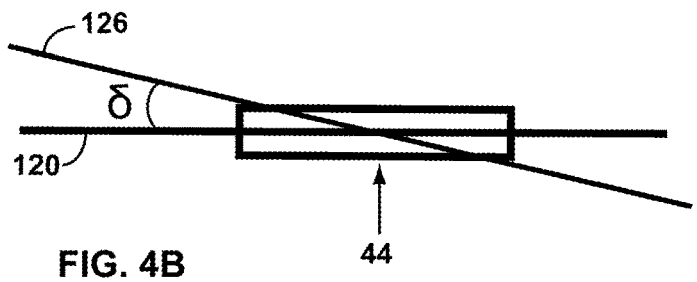
FIG. 4B illustrates the roll baseline and a certain horizontal tilt used during the horizontal scrolling of the example of FIG. 4A.
Figure 4C:
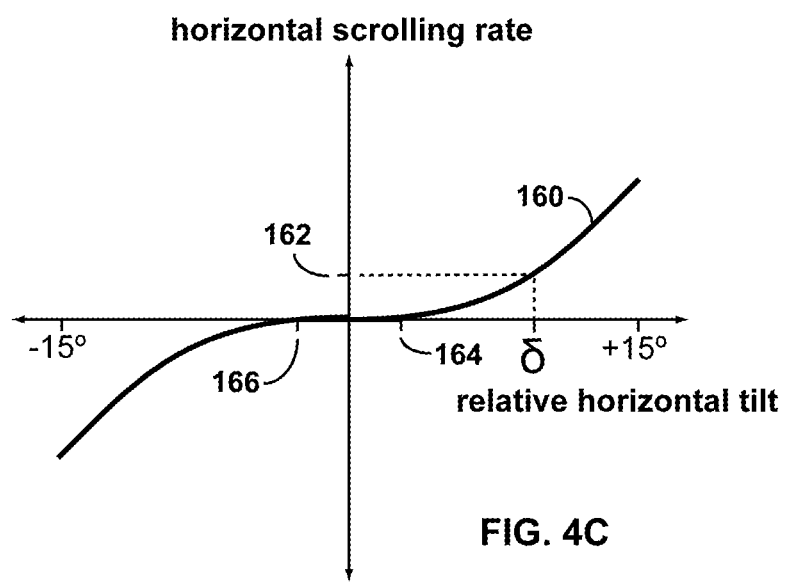
FIG. 4C shows an example of a response curve used to compute the horizontal scrolling rate from the changing tilt along the roll axis of the electronic device during the horizontal scrolling demonstrated in FIG. 4A.

Another flexible approach to perform scrolling based on tilt changes is to convert the tilt changes into a corresponding rate (or speed) of scrolling, as taught by my RotoView patents cited above. We will refer in this application to this mode of motion-based view navigation as Dynamic Scroll mode. FIGS. 4A-4C illustrate a horizontal Dynamic Scroll example taken in response to the device rotation around the roll axis 60. Vertical Dynamic Scroll is similar to the horizontal scrolling so that the horizontal example is fully applicable to the issues presented with vertical Dynamic Scroll.

FIG. 4A illustrates three screen view positions over the contents view 50 during the horizontal Dynamic Scroll example. At the start of the scrolling process, the screen view 42 is placed at an arbitrary screen position 100. When the relative horizontal tilt is decreased by rotating the device in a counter clockwise direction, the screen view reaches position 106 at the left edge 52 of the contents view 50. When the device is tilted clockwise the screen view reaches position 108 at the right edge 54 of the contents view. Note that this relation between tilt direction to scrolling direction follows the "Mirror Style", and can be reversed if "Window Style" is chosen.

The Dynamic Scroll mode of operation requires smaller relative tilts than the Proportional Scroll mode. FIG. 4B illustrates one instance of the roll rotations during the horizontal Dynamic Scroll of FIG. 4A as seen from the bottom edge view 44 of the electronic device. The arbitrary tilt of the device 40 along the roll axis at the start of the Dynamic Scroll example is captured as the roll baseline 120. At the instance shown in FIG. 4B the electronic device is tilted to line 126 to form a relative horizontal tilt $\delta$ which is translated to a horizontal scrolling rate 162 by the response curve 160 shown in FIG. 4C.

A response curve can be a linear or a non-linear graph that relates the device relative tilt value to a scrolling rate of the screen view. Equivalently, a response graph may be represented by a table of speed values corresponding to relative tilts, a list of threshold values, or by a mathematical function that may include specific boundary conditions. A simple response curve may consist of a single value or a constant that is used to multiply the relative tilt to obtain the scrolling rate. This results in a simple linear graph that relates the relative tilt to the scrolling rate. Some applications may require a response curve with a fixed rate of scrolling, so the response curve is just a single number equal to that rate of scrolling. Other embodiments may require a response curve where only a fixed rate scrolling is needed when the relative tilt exceeds a positive threshold value (or goes below a negative threshold value). Such a response curve may be represented by a step function with one positive and one negative threshold values.

The respond curve may be selected automatically from a plurality of stored response curves to fulfill the special needs of a particular application, or it can be selected by the user who wishes to customize the scrolling speed. Some embodiments may dynamically change the response curve during the scrolling process. This allows the user to start the scrolling with a coarse response curve, followed automatically by a fine response curve. In some embodiments the user can change the response curve on the fly during the scrolling to achieve instant faster or slower response.

The example response curve of FIG. 4C is a non-linear graph, having a range of tilt from negative value 166 to positive value 164 with no scrolling speed to create a threshold for noise reduction. The scrolling speed increases at an accelerated rate as the tilt increases, allowing the user to quickly scroll when producing a strong tilt and to slow down for a fine scrolling at lower tilts.

When the magnification of the screen is relatively small, the Proportional Scroll mode provides a convenient view navigation experience. Accurate rotation sensors like gyroscopes or cameras allow the device to use a small rotation range (e.g. 30 degrees) to scroll the entire contents view. However, when the magnification becomes large, Proportional Scroll requires the user to rotate the device across a wide angle range in order to cover the entire contents view. This requires the user to look at the screen at a sharply oblique direction (depending where the user scrolls), which reduces the quality of image perception and the readability of the information on the display. While the rotation range can be lowered in order to allow more scrolling distance for less rotation change, scrolling accuracy is reduced and may become unstable as small rotation measurement noise may cause instability in the screen view position.

Figure 5A:
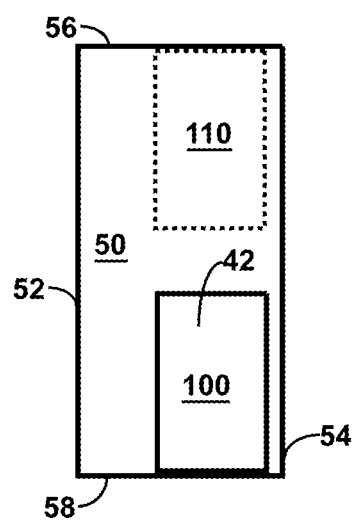
FIG. 5A outlines screen view positions over the contents view during an example of a vertical scrolling comparing Proportional Scroll mode and Dynamic Scroll mode in accordance with some embodiments of the present invention.
Figure 5B:
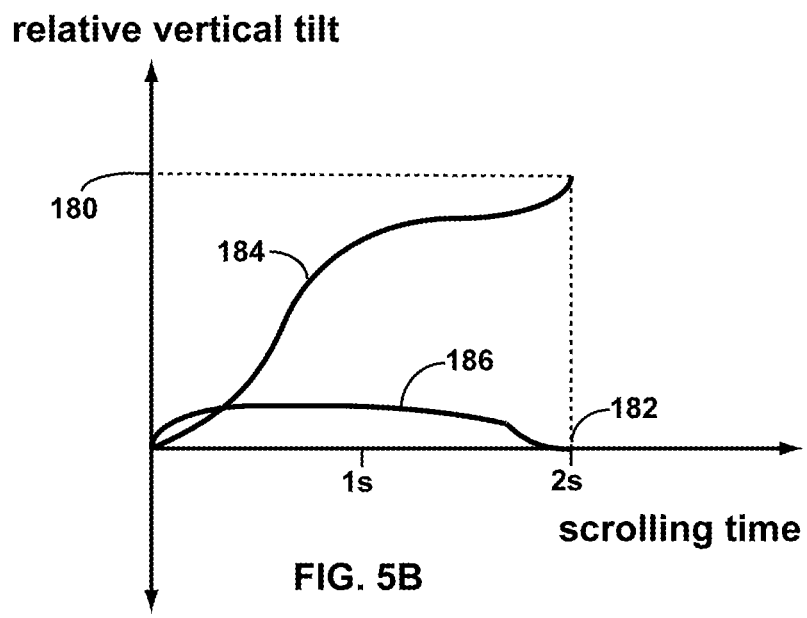
FIG. 5B illustrates the vertical tilt of the electronic device during the vertical scrolling example of FIG. 5A.

A comparison between a Proportional Scroll mode and Dynamic Scroll mode performed along the same vertical path across the contents view and lasting the same time is illustrated in FIGS. 5A and 5B. FIG. 5A shows the vertical path of the scrolling from initial screen position 100 near the bottom edge 58 of the contents view 50 to the final screen position 110 near the top edge 56 of the contents view. FIG. 5B contains two graphs showing the relative vertical tilt versus the scrolling time for both scrolling modes. The graph 184 is for the Proportional Scroll and graph 186 is for the Dynamic Scroll. During Proportional Scroll mode, the user must increase the relative vertical tilt in order to move the screen view from bottom screen position 100 to top screen position 110. The curvy nature of graph 184 is merely indicating how the user may have changed the relative vertical tilt along the path to the top edge. At the end of the path, the relative vertical tilt equals the full vertical rotation range. During the Dynamic Scroll mode, the user produces relatively small tilt changes that control the speed of scrolling. As a result, graph 186 remains bounded by a small relative vertical tilt, with a final tilt equal to 0 at the end of the path.

Figure 6A:
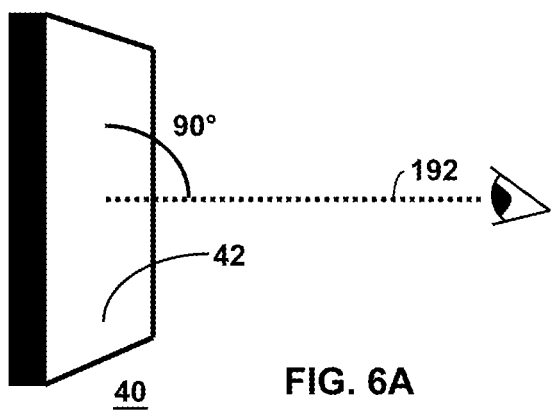
FIG. 6A shows the optimal viewing condition when the display is perpendicular to the line of sight.
Figure 6B:
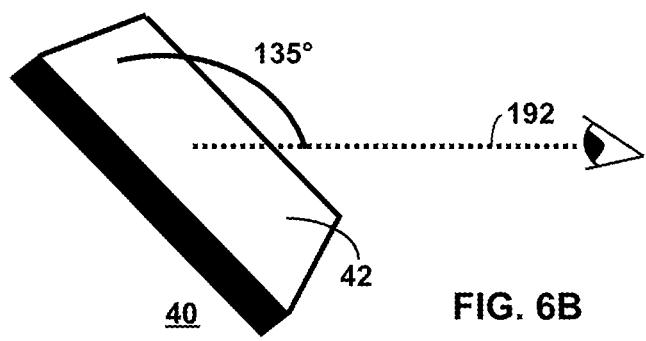
FIG. 6B shows a bad viewing condition when the display is held at an oblique angle to the line of sight.

The user gains the best viewing experience when the screen surface is held perpendicular to her eyes as shown in FIG. 6A. Assuming that the user starts the vertical scroll example of FIG. 5A holding the device at the optimal viewing position of FIG. 6A, graph 184 indicates that the Proportional Scroll mode ends in the viewing position of FIG. 6B. Clearly, FIG. 6B shows that the device is held at a sharp oblique angle relative to the user's line of sight 192, creating a difficult viewing condition. Since Dynamic Scroll uses rotation changes to determine the speed and direction of the scroll, the device is returned to the initial optimal orientation of FIG. 6A at the end of the scroll. Hence Dynamic Scroll is very useful when the contents view is highly magnified, while Proportional Scroll mode is more useful for smaller magnifications.

Figure 7:
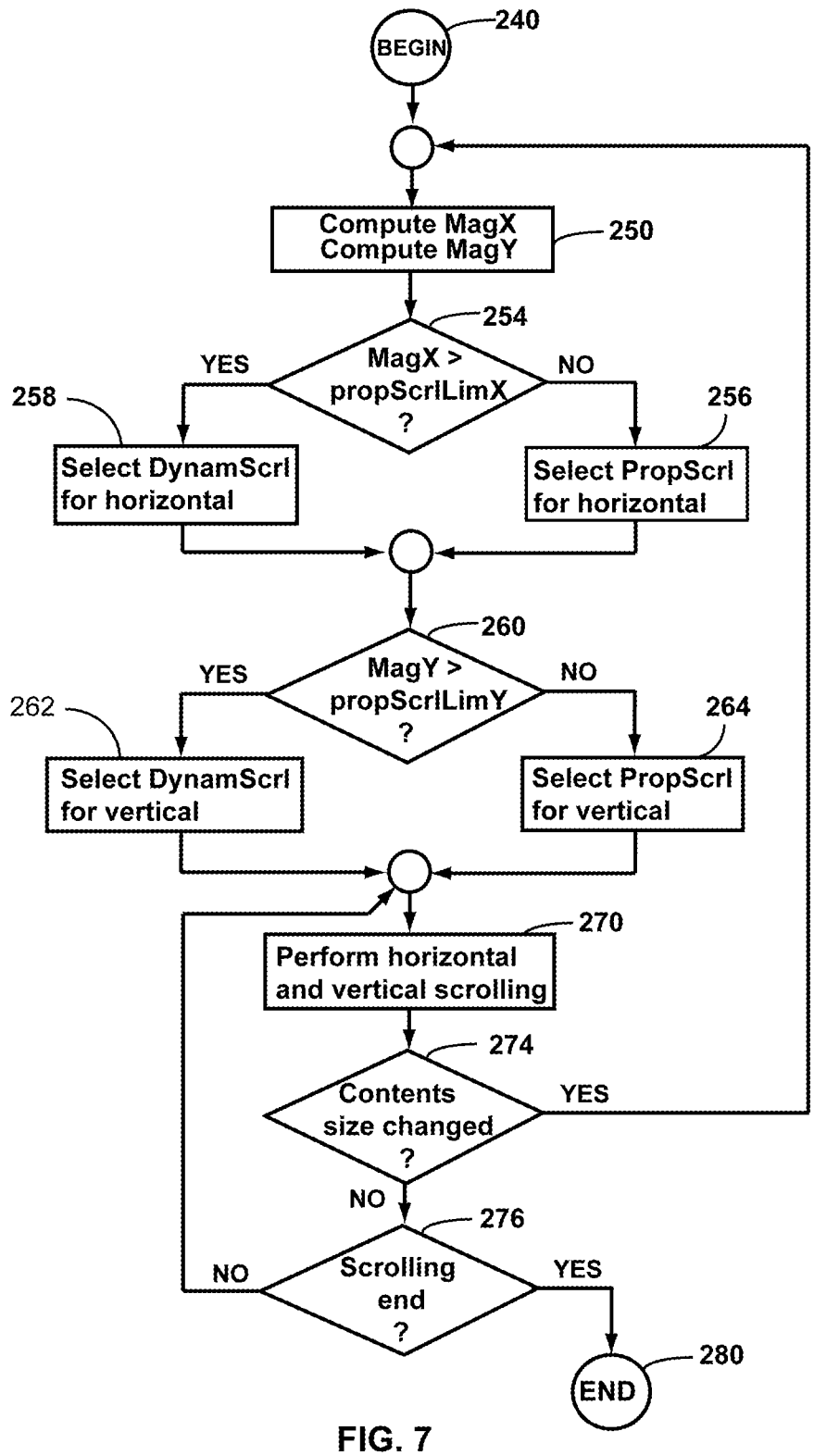
FIG. 7 illustrates the software flow diagram of a motion-based scrolling program with automatic selection of scroll type for the horizontal and vertical direction in accordance with some embodiments.

FIG. 7 shows the software flow diagram for a motion-based view scrolling system that automatically selects the horizontal and vertical scrolling modes based on the contents view's horizontal and vertical magnifications. The program computes the horizontal magnification MagX and the vertical magnification MagY at step 250. At decision step 254 it checks if the horizontal magnification MagX is larger than the propScrlLimitX value, and if so it selects the Dynamic Scroll (DynamScrl) mode for the horizontal scrolling at step 258. If MagX is smaller or equal to propScrlLimitX, step 256 selects the Proportional Scroll (PropScrl) mode for the horizontal scrolling. At decision step 260 the program checks if the vertical magnification MagY is larger than the propScrlLimitY value, and if so it selects the Dynamic Scroll mode for the vertical scrolling at step 262. If MagY is smaller or equal to propScrlLimitY, step 264 selects the Proportional Scroll mode for the vertical scrolling.

The propScrlLimitX and propScrlLimitY can be set in accordance with a preference setting of the user, or they can be selected automatically for each type of media to be scrolled. For example, a magnified image viewer may be set to higher limit values than a map scrolling, because a map scrolling continuously loads portions of the contents view while a magnified image is available instantly. In general, the selection of such limit values are made as a tradeoff between the benefits and limitations of each mode as described above, taking into account sensor accuracy and user's tolerance to various rotation ranges used during Proportional Scroll mode. Using the horizontal scroll examples of FIG. 3A and FIG. 4A, if the propScrlLimitX is set to 4.0, the scrolling associated with FIG. 3A will be Proportional Scroll, as MagX=a/b is clearly below 4.

Once the horizontal and vertical scroll modes are selected, the electronic device performs the horizontal and vertical scrolling at step 270. The scrolling process is iteratively repeated along the loop of step 270 and decision steps 274 and 276. The dimensions of the contents view are checked at step 274, as the contents view may be dynamically updated. If the size is changed, the scroll mode selection process is repeated via steps 250 to 264. The program ends when the scrolling process ends at decision step 276.

Figure 8:
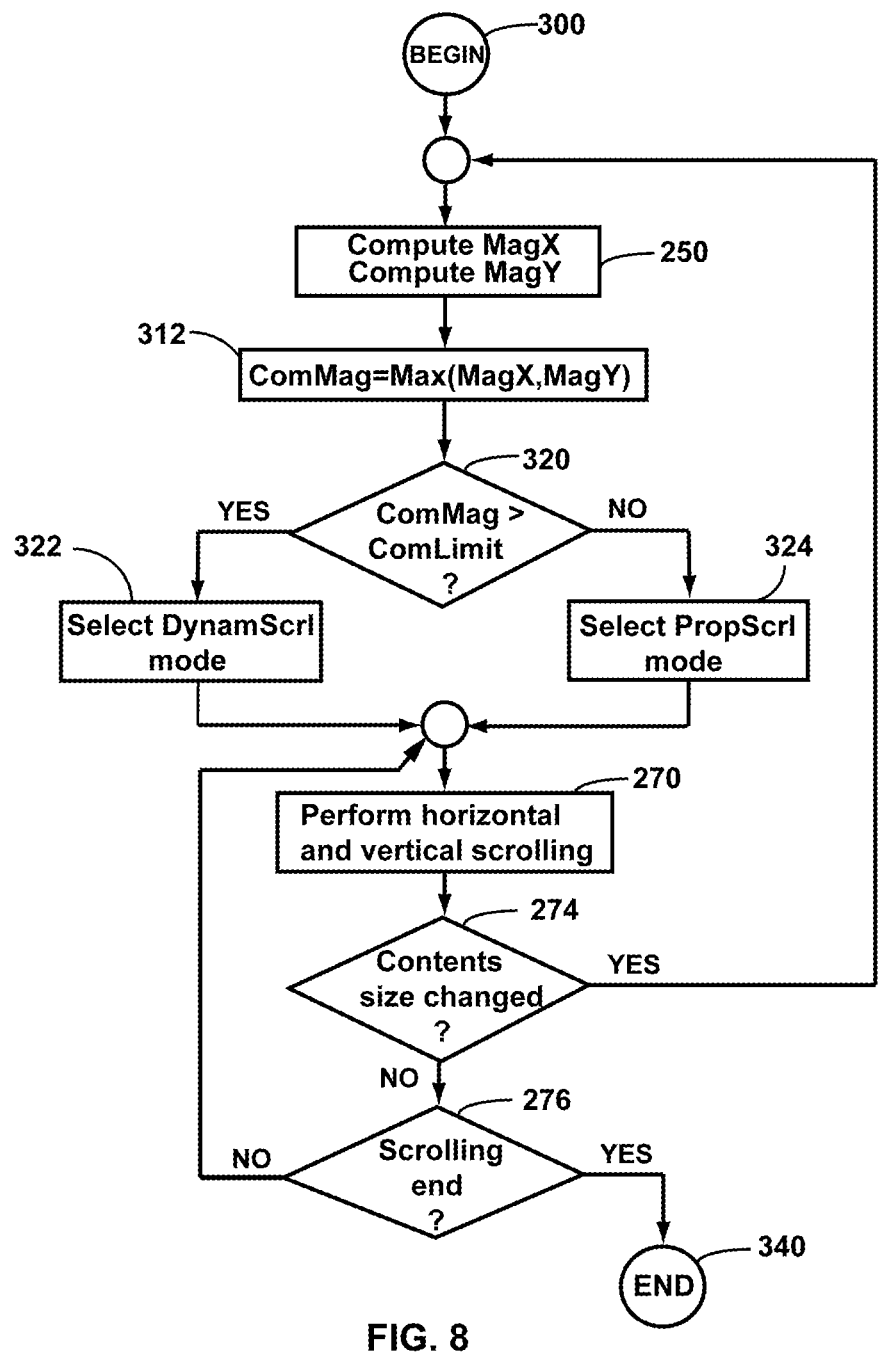
FIG. 8 illustrates the software flow diagram of a motion-based scrolling program with automatic selection of a common scroll type in accordance with some embodiments.

FIG. 8 shows the software flow diagram of another embodiment of a motion-based view scrolling system that automatically selects a common scrolling mode for both the horizontal and vertical directions based on the horizontal and vertical magnifications of the contents view. The program computes the horizontal magnification MagX and the vertical magnification MagY at step 250 and selects a common magnification ComMag=Max(MagX, MagY) at step 312. At decision step 320 the program checks if the common magnification value ComMag is larger than a common limit value ComLimit, and if so it selects the Dynamic Scroll mode at step 322. If ComMag is smaller than or equal to ComLimit, step 324 selects the Proportional Scroll mode for both the horizontal and vertical scrolling. The scrolling process is iteratively repeated along the loop of step 270 and decision steps 274 and 276 as described in the discussion above of FIG. 7.

The common limit value ComLimit can be set as a preference by the user, or can be selected automatically for each type of media to be scrolled. In some embodiments, the determination of contents size change 274 and scrolling end 276 can rely on interrupt notification rather than on the polling mechanism illustrated in FIGS. 7 and 8.

The Proportional Scroll mode exhibits a non-responsive range of tilt changes occurring beyond the rotation range α (e.g. between the graph points 146 to 142 and between the graph points 148 to 144 of FIG. 3C). This limitation can be resolved using the baseline update process illustrated in FIG. 9. The following description relates to the horizontal scrolling example of FIGS. 3A-3C and it is similar for vertical scrolling.

Figure 9:
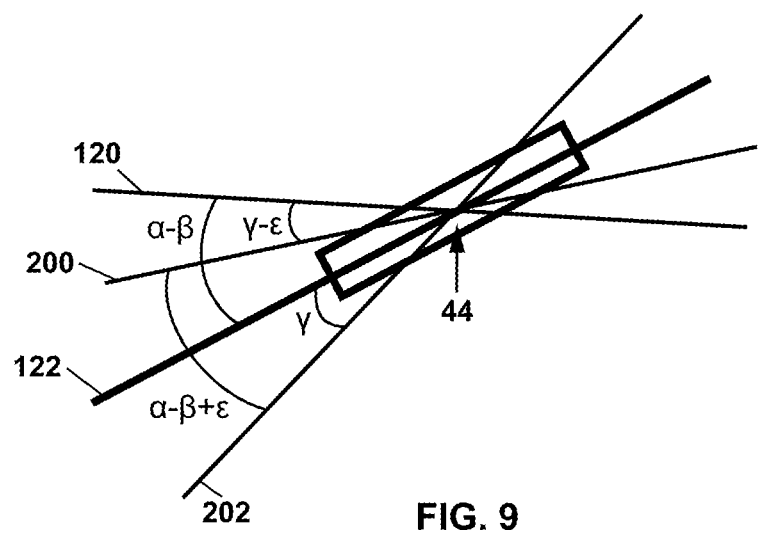
FIG. 9 shows the process of baseline updates during a horizontal Proportional Scroll mode in accordance with some embodiments.

FIG. 9 illustrates the baseline update process, where the horizontal baseline 120 is captured at the start of the horizontal scrolling. As the device is tilted to line 122 the screen view reaches screen position 102 at the left edge 52 of the contents view 50. This corresponds to the graph point 142 in FIG. 3C, at the relative horizontal tilt β−α where α is the horizontal rotation range. β−α is defined as the left horizontal edge angle and must be captured during the baseline update process. β is defined as the right horizontal edge angle (with similar top and bottom vertical edge angles defined for vertical scrolling). In order to avoid the non-responsive range beyond this position, the baseline update process iteratively updates the baseline 120. As a result, when the device is further tilted by an extra counter clockwise angle of γ to reach a current tilt along line 202, the horizontal baseline 120 is replaced with a new horizontal baseline 200. The new baseline may be rotated by the same γ angle to track the rotation beyond the scrolling limit (due to the screen view reaching the left edge 52 of the contents view). It is also possible to adjust this change with a relatively small padding angle ε, as is actually illustrated in FIG. 9 by the angle γ−ε between the initial horizontal baseline 120 and the new horizontal baseline 200. This sets the new baseline 200 at an angle of α−β+ε from the current tilt line 202.

Using the above baseline update scheme, rotating clockwise back from line 202 has almost immediate scrolling effect to move the screen view from the left edge, without the large non-responsive range between graph points 146 to 142 of FIG. 3C. In fact, scrolling responsiveness starts once the back rotation exceeds the arbitrarily small padding angle ε. Some embodiments may set ε to 0 if so desired, but a small ε provides an "edge padding" range which improves the user experience when rotating back from an edge.

Figure 10:
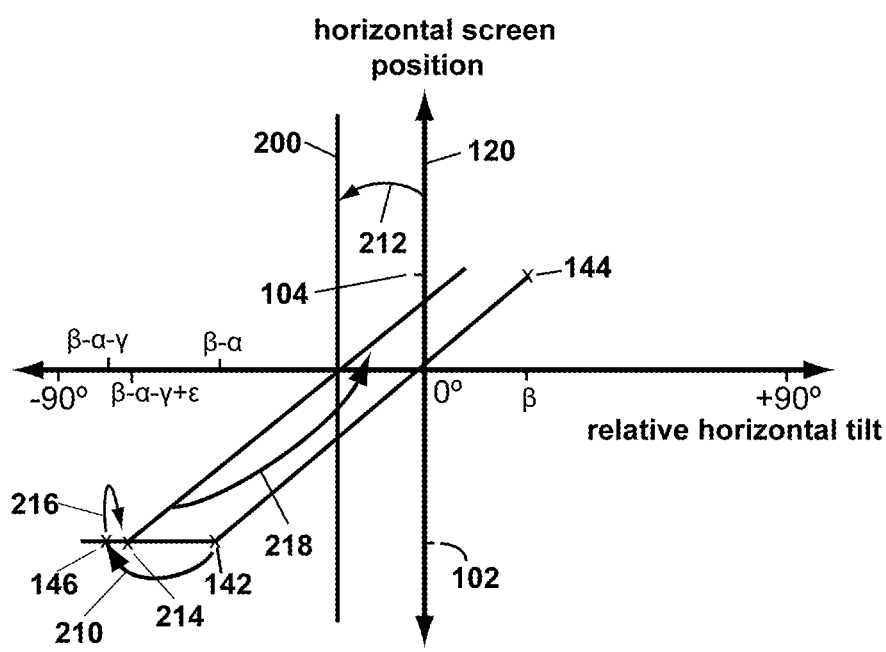
FIG. 10 depicts a graph relating the screen view horizontal position to the tilt along the roll axis corresponding to the baseline update process of FIG. 9

FIG. 10 illustrates the baseline update process of FIG. 9 with a modified section of the Proportional Scroll graph of FIG. 3C. When the relative horizontal tilt is decreased (see arrow 210) from graph points 142 to 146 to reach angle β−α−γ, the baseline is updated by a translation 212 of the original graph to the left along the relative horizontal tilt axis, shifting the baseline 120 from the 'horizontal screen position' axis of the graph to the updated baseline 200. If the "edge padding" angle ε is larger than 0, there is a small intentional non-responsive range 216, when the device is rotated back from graph point 146 to graph point 214 corresponding to angle β−α−γ+ε. Scrolling becomes responsive to the user clockwise roll rotation 218 from graph point 214. If ε is set to 0, the scrolling is immediately responsive when the user rotates clockwise (back), thus eliminating the entire non-responsive range between graph point 146 to 142 that occurred without a baseline update. The baseline update 212 can be done iteratively at a preset update rate (e.g. at 3-8 updates per second) and may use filtering or average calculation techniques as described below.

Figure 11:
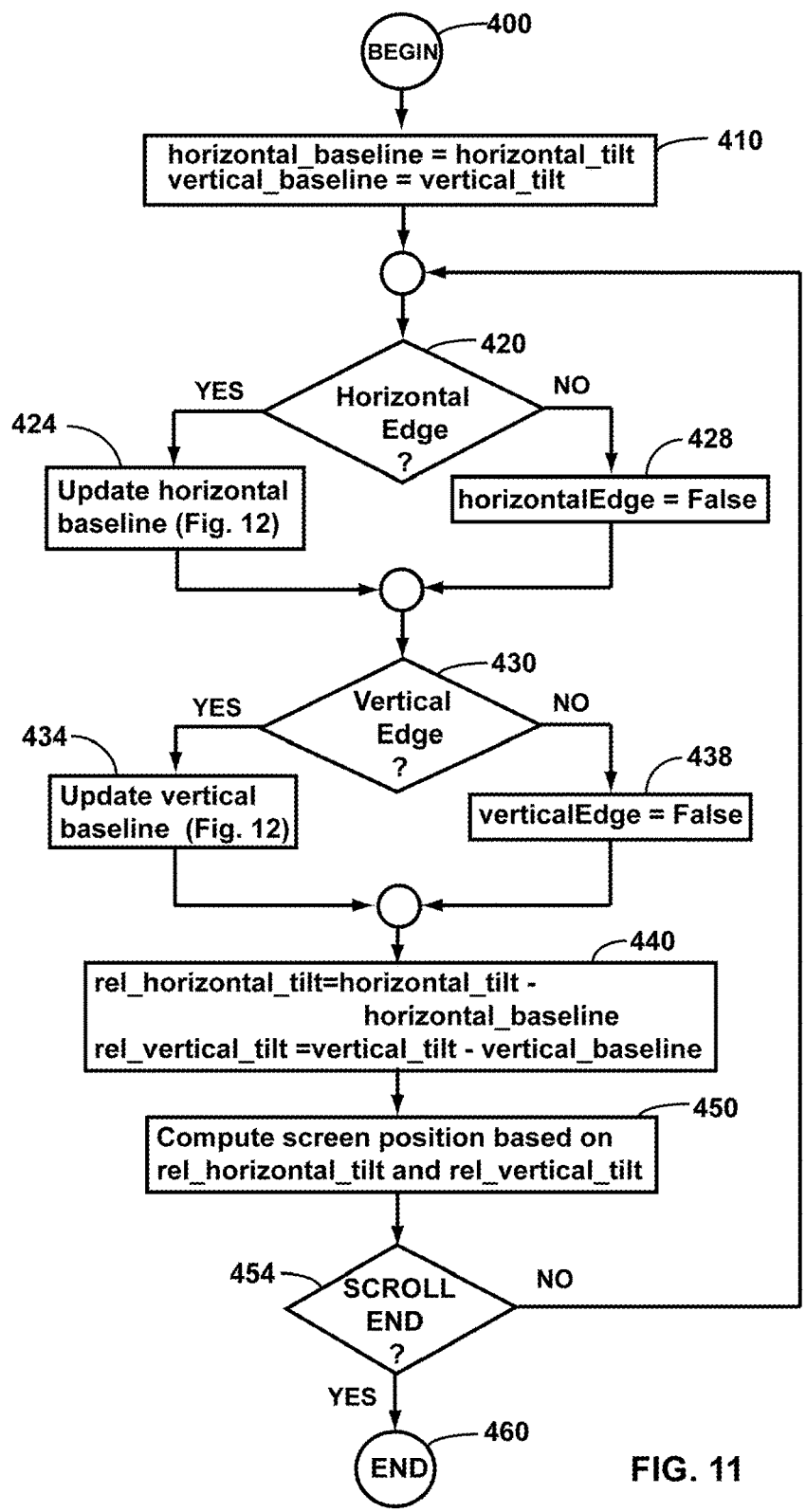
FIG. 11 outlines the software flow diagram for the Proportional Scroll mode in accordance with some embodiments of the present invention.

FIG. 11 illustrates the software flow diagram of one embodiment of the present invention that performs the Proportional Scroll with baseline updates. The motion sensor 20 provides continuous measurements of the horizontal tilt and vertical tilt of the device. The Proportional Scroll starts at step 400 in response to a user scroll starting command and step 410 sets the horizontal baseline with the current horizontal tilt and the vertical baseline with the current vertical tilt. The program then repeatedly performs steps 420, 430, 440 and 450 to compute the Proportional Scroll process until decision step 454 identifies a user's command to end the scrolling process at step 460.

Figure 12:
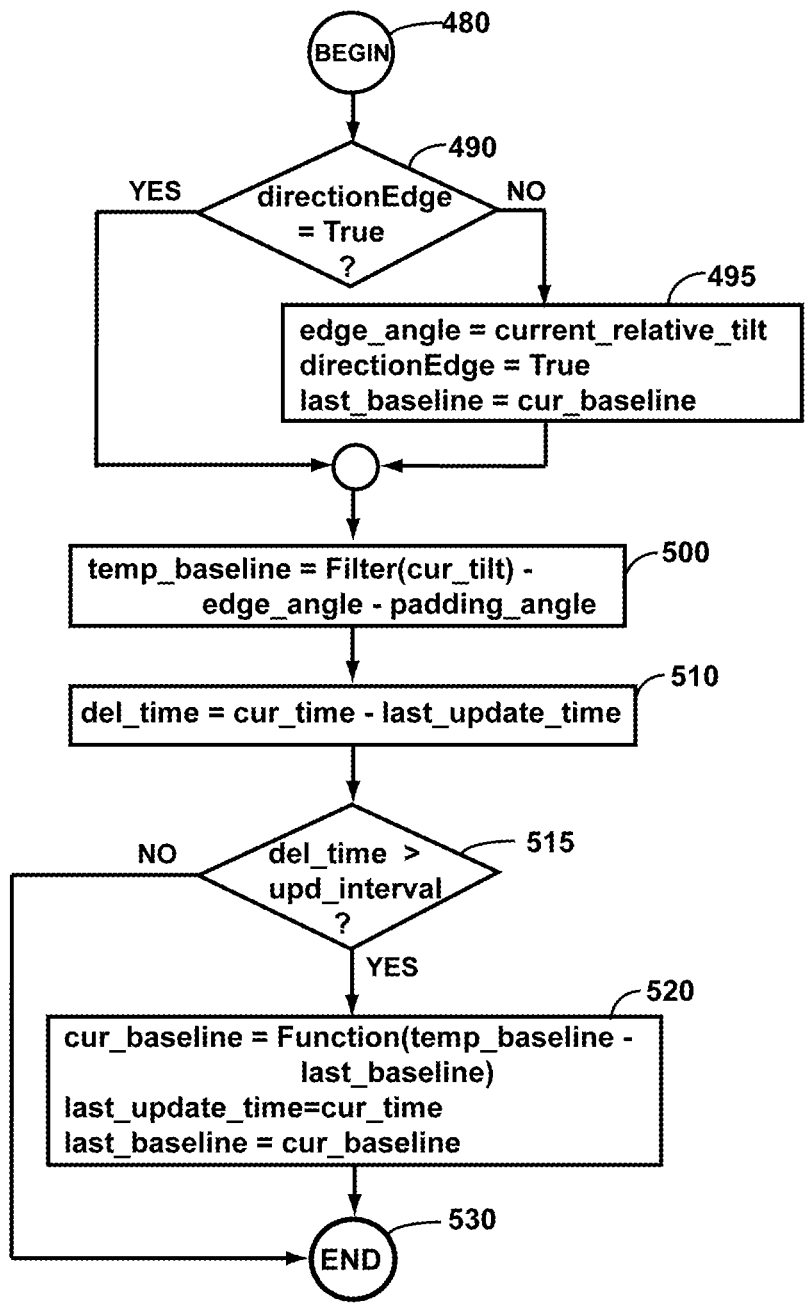
FIG. 12 shows the software flow diagram for the baseline update process for the Proportional Scroll program of FIG. 11.

Decision step 420 checks if the scrolling caused the screen view 42 to reach the horizontal edge of the contents view 50 (left edge 52 or right edge 54 in FIG. 2). If a horizontal edge is detected, step 424 updates the roll baseline in accordance with the baseline update process outlined in FIG. 12. If a horizontal edge is not detected, step 428 clears the horizontal edge detection flag. This flag is used by the baseline update process in FIG. 12 to insure a single recording of the left and right horizontal edge angles (defined in FIG. 3C as β−α and β respectively). Decision step 430 checks if the scrolling caused the screen view to reach the vertical edge of the contents view (top edge 56 or bottom edge 58 in FIG. 2). If a vertical edge is detected, step 434 updates the pitch baseline in accordance with the baseline update subroutine (FIG. 12). If a vertical edge is not detected, step 438 clears the vertical edge detection flag. This flag is used by the baseline update process to insure a single recording of the top and bottom vertical edge angles. The edge angles can be determined directly from the initial geometrical relation between the screen view and the contents view. However, if the contents view is dynamically changing, it is required to recapture the edge angles whenever the screen view reaches the edge. Recapture of edge angles is also required in embodiments with less accurate motion sensors that may exhibit an angular drift.

The user can set and modify the horizontal rotation range α used for the calculation of the horizontal scroll, and the vertical rotation range φ used for the vertical scroll calculation. It may be more convenient for the user to set different values for α and φ. Often φ will be set to a smaller value than α due to the natural horizontal geometry of the two eyes placement in the human face. The rotation ranges should be properly adjusted for devices allowing contents viewing that automatically switch between portrait and landscape modes.

The tilt changes for scroll computation are determined in step 440. The relative horizontal tilt ("rel_horizontal_tilt") is set to the current horizontal tilt minus the horizontal baseline. The relative vertical tilt ("rel_vertical_tilt") is set to the current vertical tilt minus the vertical baseline. Processing step 450 uses the relative horizontal tilt and the relative vertical tilt to determine the screen position using the response graph controlling the Proportional Scroll. The response graph (like those shown in FIG. 3C and FIG. 10) sets a linear relation between the relative tilt and the screen position which depends on the rotation range and the maximum scrolling distance. The response computation computes the scrolling distance by simply multiplying the relative tilt by the maximum scrolling distance divided by the rotation range. The values of the relative tilts must be converted to the same angular units of rotation ranges α and φ. Using the view dimensions of FIG. 2, the horizontal scrolling range (a-b) and the vertical scrolling range (c-d), and the rotation ranges α and φ, the horizontal scrolling distance is $$\text{rel\_horizontal\_tilt}*(a-b)/\alpha$$

and the vertical scrolling distance is $$\text{rel\_vertical\_tilt}*(c-d)/\varphi.$$

The process for updating the horizontal and vertical baselines during the Proportional Scroll is described in more detail in FIG. 12. It is started at step 480 when the screen view 42 reaches one or two edges of the contents view 50. If the screen view reaches a single edge then only the corresponding horizontal or vertical baseline is updated. When the screen view reaches a corner of the contents view both horizontal baseline and vertical baselines are updated simultaneously. Since the roll baseline and vertical baseline update processes are the same, FIG. 12 uses general naming variables that can apply for horizontal and vertical instances (e.g. directionEdge instead of horizontalEdge or verticalEdge). Some embodiments of the present invention may use different parameters to modify the filtering and average calculations between the horizontal baseline update and the vertical baseline update.

Steps 490 and 495 insure that the horizontal or vertical edge angles are recorded only once at the edge_angle when the screen view reaches an edge. Decision step 490 checks the directionEdge flag (which is the horizontalEdge or verticalEdge flags from FIG. 11). If the directionEdge flag is false then this is the first iteration of the baseline process with the current edge. Step 495 sets the horizontal or vertical edge_angle variable with the current relative tilt. The directionEdge flag is set true to insure that the edge_angle value is kept and the current baseline is recorded in the last_baseline variable. Recall from FIG. 11 that this flag is cleared only when the screen view is no longer at the edge that caused the first call for the baseline update process.

In processing step 500 a temporary baseline value ("temp_baseline") is taken from a filtered value of the current horizontal or vertical tilt reduced by the edge_angle. If the "edge padding" range 216 of FIG. 10 is used, the corresponding "padding_angle" (angle ε in FIG. 9) is also deducted from the temp_baseline to insure that the new baseline will be kept at an additional padding distance of £ from the actual rotation beyond the edge screen position.

Using the optional filtered value of the current tilt in step 500 insures that the new baseline will reflect the smoothed value of the tilt measurement. The filter is preferably a low pass filter or a running average, although other type of filters can be used (or even no filter at all when stable sensors are available). The actual filtering computation can be performed within the main loop of the flow chart of FIG. 11 even when edges are not detected. This insures that a stable filtered value is readily available at step 500 during the baseline update. In such a case, the filter calculations are made immediately after the capture of the roll and pitch orientations in step 410 of FIG. 11.

When edge condition is detected in the flow chart of FIG. 11, the baseline update process is called every time that the sensor produces new data for scrolling control. It is desirable to update the baseline value only at an update interval ("upd_interval") which is much larger than the sensor update interval. Typically, the update interval can be 150-800 mS, while the sensor update interval may be set at 40 mS or faster. Step 510 computes the elapsed time from the last time the baseline was updated. Decision step 515 determines if the update interval is exceeded, and if so, it assigns a new current baseline in step 520. The new current baseline can be a straight assignment of the temporary baseline of step 500 or some average function of the temporary baseline and the last baseline. The parameters of the average function are selected to provide the smoothest user experience in performing the baseline update process. The new current baseline is stored as the last baseline variable for the next iteration.

Figure 13:
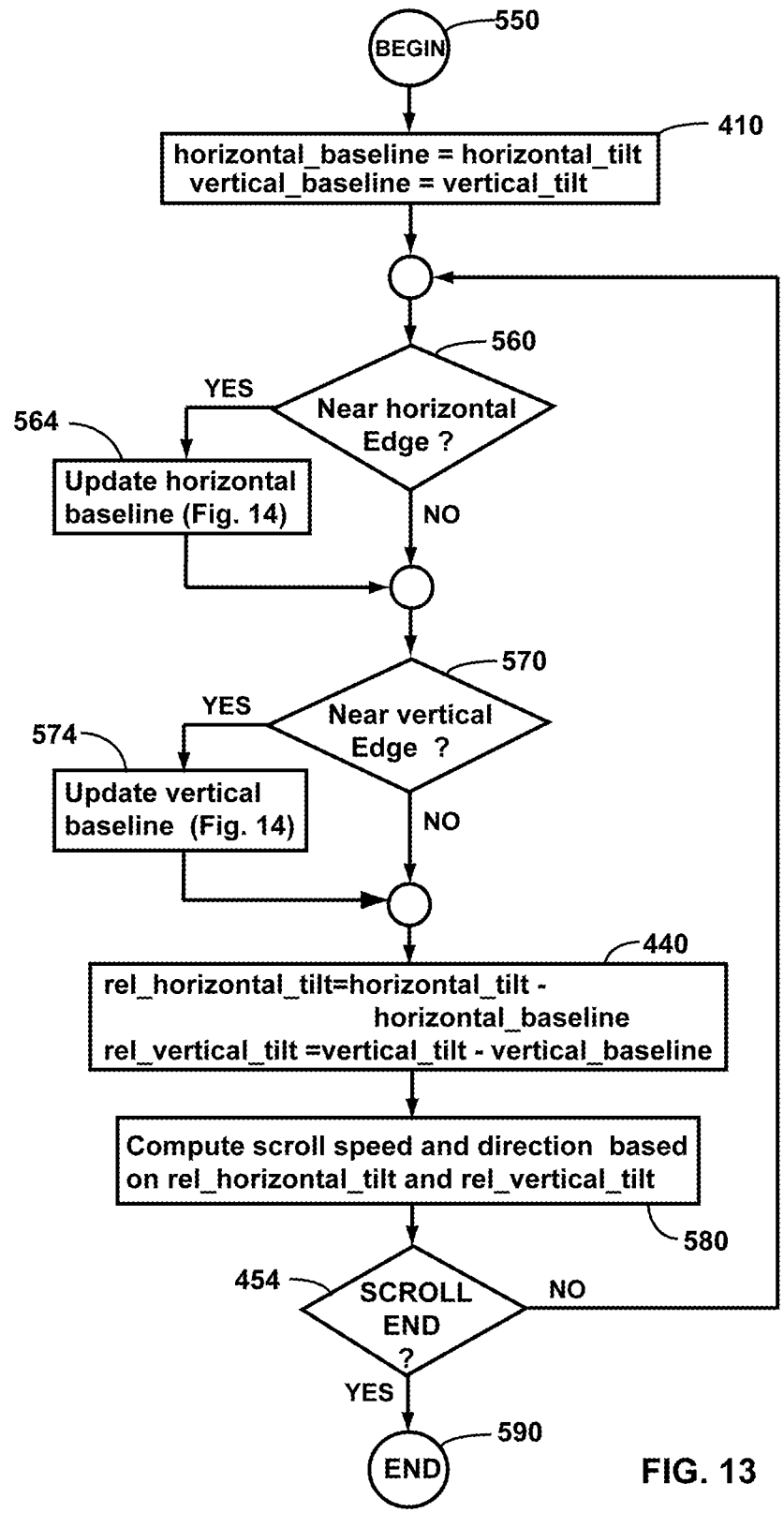
FIG. 13 outlines the software flow diagram for the Dynamic Scroll mode in accordance with some embodiments of the present invention.

FIG. 13 illustrates the software flow diagram of one embodiment of the present invention that performs the Dynamic Scroll with baseline updates. Baseline update improves the responsiveness of the Dynamic Scroll when the device is held with a relative tilt larger than zero while the screen view is already at or near the edge. As the screen view cannot move further with this relative tilt, the baseline update gradually changes the baseline to the current tilt, bringing the relative tilt to zero. Any subsequent rotation of the device in the opposite direction is immediately responsive. The baseline update may also minimize some sensor drift effects.

Software steps 410, 440, and 454 of FIG. 13 are identical to the software steps with the same numerals of the software flow diagram of FIG. 11, and will be briefly described here. At the start 550 of the Dynamic Scroll session, the horizontal and vertical baselines are captured in step 410. At decision step 560, the software determines if the screen view position is near the left or right edges of the contents view. This can be determined by defining the "near distance" as a preset percentage of the width of the contents view (e.g. 5-10%). If the screen view position is near the horizontal edge, step 564 performs the roll baseline update process described below in FIG. 14. Similarly, the software determines at decision step 570 if the screen view position is near the top or bottom edges of the contents screen. If the screen position is near a vertical edge, step 574 performs the pitch baseline update process of FIG. 14. Unlike the baseline update of FIG. 12 for the Proportional Scroll where update can be made only when the device is rotated beyond the edges of the contents view, the baseline update for the Dynamic Scroll occurs whenever the screen view is near the contents view edges.

The relative horizontal tilt and the relative vertical tilt are computed in step 440. The software computes in step 580 the scrolling speed and direction of the screen view based on the relative tilts. Step 580 may implement the methods described in my RotoView patents cited above. The program then repeatedly performs steps 560, 570, 440 and 580 to process the Dynamic Scroll until decision step 454 identifies a user's command to end the scrolling process at step 590.

Figure 14:
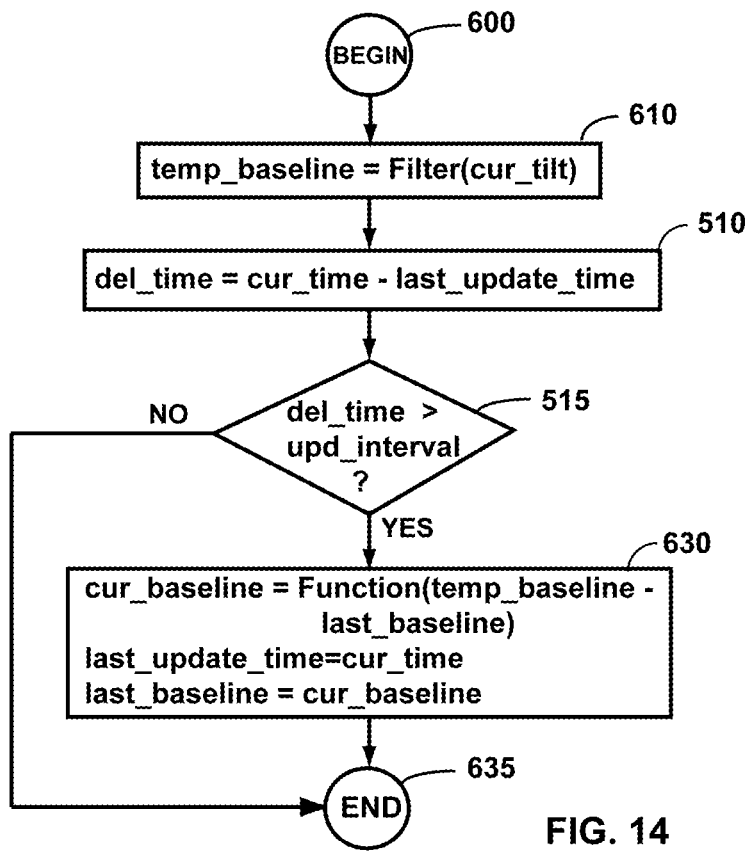
FIG. 14 shows the software flow diagram for the baseline update process for the Dynamic Scroll program of FIG. 13.

The update process for the horizontal and vertical baselines during the Dynamic Scroll mode is described in more detail in FIG. 14. A temporary baseline is derived from a filtered value of the current tilt of the device as shown in step 610. Alternatively, the current tilt may be directly copied into the temporary baseline. The baseline update rate is done at a lower rate than the sensor update rate using step 510 and decision step 515. Decision step 515 determines if the update interval is exceeded, and if so, it assigns a new current baseline in step 630. The new current baseline can be a straight assignment of the temporary baseline of step 610 or some average function of the temporary baseline and the last baseline. The parameters of the average function are selected to provide the smoothest user experience in performing the baseline update process. The new current baseline is stored as the last baseline variable for the next iteration.

It is possible in some embodiments of the Proportional Scroll mode to use a non-linear relation for the mapping of the relative tilt to the screen position, provided that all possible screen positions are mapped to a valid relative tilt within the horizontal and vertical rotation range. For example, such a relation may have an approximate proportional range covering 50% of the contents view in the vicinity area currently shown on the screen view. The mapping of the contents view area further away can be assigned increasing relative tilt values. Such non-linear relation may be useful in applications that have low priority to reach the edge of the contents view because the edge might be dynamically updated (e.g. map scrolling).

Figure 15:
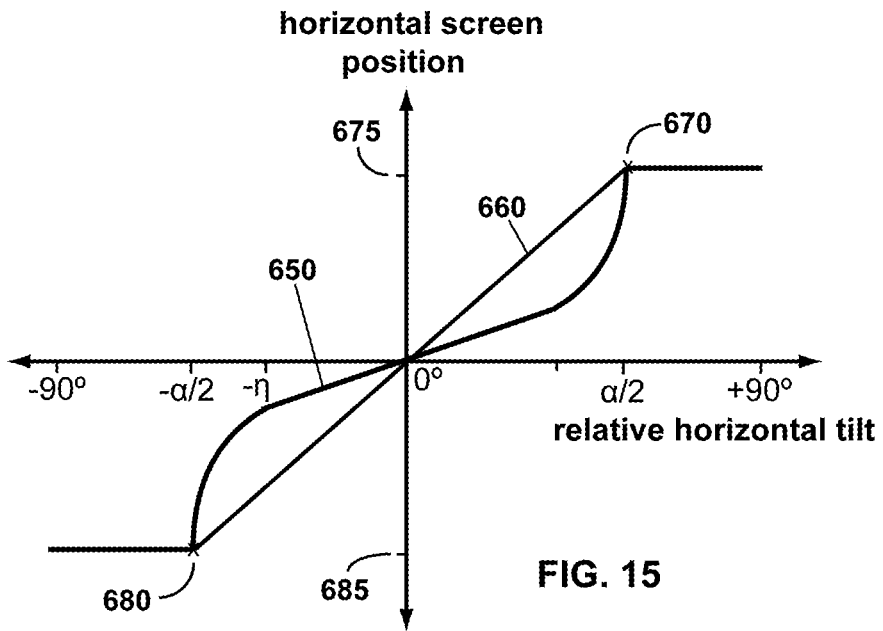
FIG. 15 illustrates a non-linear mapping that may be used for Proportional Scroll mode in some embodiments of the present invention.

FIG. 15 illustrates such a non-linear relation 650 for use in Proportional Scroll mode performed horizontally and compares it to a linear relation 660 similar to the examples discussed above. The graphs of these relations depict the situation where the screen view position is set at the horizontal middle of the contents view and the horizontal rotation range is set to $\alpha$. When the relative horizontal tilt reaches $\alpha/2$ the screen view reaches the right edge of the contents view and any further increase of the relative horizontal tilt beyond graph point 670 keeps the screen view at the edge position 675. When the relative horizontal tilt reaches $-\alpha/2$ the screen view reaches the left edge of the contents view and any further decrease of the relative horizontal tilt beyond graph point 680 keeps the screen view at the edge position 685. The non-linear relation 650 is approximately linear between relative horizontal tilts $-\eta$ and $\eta$. From relative horizontal tilt $\eta$ to $\alpha/2$ the relation 650 converges faster to graph point 670, where the screen view reaches the right end. Similarly at the opposing end, from relative horizontal tilt $-\eta$ to $-\alpha/2$ the relation 650 converges faster to graph point 680, where the screen view reaches the left edge of the contents view. Using the linear relation 660, the screen view scrolls uniformly across the contents view as the user changes the relative horizontal tilt. In contrast, the non-linear relation 650 scrolls more finely between relative horizontal tilts $-\eta$ and $\eta$. The scrolling becomes more coarse as the screen view come closer to the edges of the contents view.

The description above contains many specifications, and for purpose of illustration, has been described with references to specific embodiments. However, the foregoing embodiments are not intended to be exhaustive or to limit the invention to the precise forms disclosed. Therefore, these illustrative discussions should not be construed as limiting the scope of the invention but as merely providing embodiments that better explain the principle of the invention and its practical applications, so that a person skilled in the art can best utilize the invention with various modifications as required for a particular use. It is therefore intended that the following appended claims be interpreted as including all such modifications, alterations, permutations, and equivalents as fall within the true spirit and scope of the present invention.

I claim:

1. A mobile system comprising:
one or more processors;
a screen display;
a motion sensor coupled to said one or more processors and configured to generate one or more tilt signals indicative of one or more tilt angles of said mobile system corresponding to one or more scrolling directions along said screen display;
memory; and
one or more programs, wherein the one or more programs are stored in the memory and configured to be executed by the one or more processors, the one or more programs comprising instructions for:
acquiring a contents view;
displaying at least a portion of said contents view on said screen display;
detecting a scrolling initiation and a scrolling termination commands when said contents view is larger than said screen display;
for each said one or more scrolling directions, in response to detecting said scrolling initiation command:
selecting a reference baseline tilt for said scrolling direction;
activating a response graph for said scrolling direction that directly maps a predefined tilt rotation range onto a scrolling range that spans said contents view from a first edge to an opposite edge along said scrolling direction; and
initializing said response graph for said scrolling direction to map the current value of said tilt signal to the current screen display position over said contents view along said scrolling direction;
for each said one or more scrolling directions, subsequent to initializing said response graph and prior to detecting said scrolling termination command:
scrolling said contents view by moving said screen display to a position on said contents view mapped by said response graph from the current relative tilt, wherein said current relative tilt is the difference between the current tilt angle of said mobile system along said scrolling direction and said corresponding reference baseline tilt; and
in response to rotation of said mobile system beyond one end of said predefined tilt rotation range, updating said corresponding reference baseline tilt, at a regular or irregular intervals, while keeping said screen display at a corresponding edge of said contents view along said scrolling direction.

2. The mobile system of claim 1, wherein said current relative tilt is recorded as an edge angle when said screen display reaches said corresponding edge of said contents view, and wherein said baseline tilt updating selects a new corresponding reference baseline tilt equal to the current tilt of said mobile system along said scrolling direction subtracted by said edge angle towards said corresponding reference baseline tilt.

3. The mobile system of claim 2, wherein said current tilt of said mobile system along said scrolling direction is derived by applying digital signal processing on a set of multiple consecutive readings of said corresponding tilt signals.

4. The mobile system of claim 2, wherein said edge angle is increased by a relatively small padding angle.

5. The mobile system of claim 1, further comprising an internet network connection accessible by said one or more programs, and wherein acquiring said contents view comprises downloading said contents view from one or more servers accessed via said internet network connection.

6. The mobile system of claim 1, wherein the one or more programs further comprising instructions for:
monitoring changes in the dimensions of said contents view while scrolling;
for each said one or more scrolling directions, in response to detecting a dimension change along said scrolling direction:
adjusting said response graph for said scrolling direction to map said predefined tilt rotation range onto a modified scrolling range that spans the modified contents view from said first edge to said opposite edge; and
reinitializing said response graph to map the current value of said tilt signal to the current screen display position over the modified contents view along said scrolling direction.

7. The mobile system of claim 1, wherein said response graph for said scrolling direction is a linear proportional relation based on the ratio of said scrolling range to said predefined tilt rotation range.

8. The mobile system of claim 1, wherein said response graph for said scrolling direction is non-linear.

9. The mobile system of claim 1, wherein said response graph for said scrolling direction is changed dynamically.

10. The mobile system of claim 1, wherein the one or more programs further comprising instructions for:
for each said one or more scrolling directions:
determining a magnification value equals to the length of said contents view divided by the length of said screen display along said scrolling direction; and
substituting said response graph for said scrolling direction with a dynamic scrolling relating said current relative tilt to scrolling speed along said scrolling direction when said magnification value exceeds a predefined value.

11. A system comprising:
one or more processors;
a screen display;
a motion sensor coupled to said one or more processors and configured to generate one or more tilt signals indicative of one or more tilt angles corresponding to one or more scrolling directions along said screen display;
a machine-readable medium comprising instructions stored therein, which when executed by the one or more processors cause the one or more processors to perform operations comprising:
acquiring a contents view;
displaying a portion of said contents view on said screen display;

detecting a scrolling initiation and a scrolling termination commands when said contents view is larger than said screen display;

selecting a corresponding reference baseline tilt for each said one or more scrolling directions in response to detecting said scrolling initiation command;

for each said one or more scrolling directions, subsequent to selecting the corresponding reference baseline tilt and prior to detecting said scrolling termination command:

scrolling said contents view along said scrolling direction at a scrolling speed determined by the current relative tilt, wherein said current relative tilt is the difference between the current tilt of said screen display along said scrolling direction and said corresponding reference baseline tilt; and updating said corresponding reference baseline tilt at a regular or irregular intervals when said screen display is scrolling at the vicinity of an edge of said contents view along said scrolling direction.

12. The system of claim 11, further comprising an internet network connection accessible by said one or more processors, and wherein acquiring said contents view downloads said contents view from one or more servers accessed via said internet network connection.

13. The system of claim 11, wherein said corresponding reference baseline tilt is derived from the current tilt of said screen display along said scrolling direction, and wherein updating said corresponding reference baseline tilt comprises replacing said reference baseline tilt with a new reference baseline tilt derived from the current tilt of said screen display along said scrolling direction.

14. The system of claim 13, wherein said new reference baseline tilt is derived by applying digital signal processing on a set of multiple consecutive readings of the current tilt of said screen display along said scrolling direction.

15. The system of claim 11, wherein said scrolling speed is determined from said current relative tilt by a response curve.

16. The system of claim 15, wherein said response curve is changed dynamically.

17. The system of claim 15, wherein said response curve is a mathematical function.

18. The system of claim 15, wherein said response curve maps the entire range of said current relative tilt onto one or more discrete values of scrolling speeds.

19. The system of claim 15, further comprising a plurality of response curves pre assigned for each type of a contents view, and wherein each said response curve for each scrolling direction is selected from said plurality of response curves based on the type of said contents view.

20. The system of claim 11, further comprising substituting said scrolling speed determined by the current relative tilt with a proportional scrolling for each scrolling direction at which the ratio of the length of said contents view to the length of said screen display along said scrolling direction is below a predefined magnification value, wherein said proportional scrolling directly maps a predefined tilt rotation range onto a scrolling range that spans said contents view from a first edge to an opposite edge along said scrolling direction.

21. A computer-implemented method comprising:
acquiring a contents view for an application executing on a mobile computing device;

magnifying, from the application, said contents view to exceed at least one of the horizontal and vertical dimensions of a screen display of said mobile computing device;

displaying a portion of said magnified contents view on said screen display;

generating a tilt signal indicative of at least one tilt angle of the mobile computing device along a first direction;

detecting, from the application, a scrolling initiation and a scrolling termination commands;

in response to detecting said scrolling initiation command:

activating a response graph that directly maps a first tilt rotation range onto a scrolling range that spans said magnified contents view from a first edge to an opposite edge along said first direction;

aligning said first tilt rotation range to cause said response graph to map the current value of said tilt angle to the current screen display position over said magnified contents view along said first direction; and storing said aligned first tilt rotation range as a baseline tilt rotation range;

subsequent to detecting said scrolling initiation command, and prior to detecting said scrolling termination command:

scrolling said magnified contents view by placing said screen display at a position mapped from the current tilt of said mobile computing device along said first direction by said response graph; and shifting said baseline tilt rotation range in the direction of said device rotation when said device is rotated beyond one end of said first tilt rotation range while keeping said screen display at the corresponding edge of said magnified contents view, and wherein said response graph is modified to map the shifted baseline tilt rotation range onto said scrolling range so that rotating the device in the opposite direction causes a substantially immediate scrolling away from said corresponding edge.

22. The computer-implemented method of claim 21, wherein acquiring said contents view downloads said contents view from one or more servers accessed via an internet network connection.

23. The computer-implemented method of claim 21, wherein said contents view including one or more of an image, text, map, and a video to be displayed by said mobile computing device.

24. The computer-implemented method of claim 21, wherein said response graph is a linear proportional relation based on the ratio of said scrolling range to said first tilt rotation range.

25. The computer-implemented method of claim 21, wherein said response graph is changed dynamically.

26. The computer-implemented method of claim 21, wherein said response graph is non-linear.

27. The computer-implemented method of claim 21, further comprising:

monitoring changes in the dimensions of said contents view during said scrolling;

in response to detecting a change in a dimension of the contents view along said first direction, adjusting said response graph to map said first tilt rotation range onto a modified scrolling range that spans the modified contents view from said first edge to said opposite edge; and reinitializing said response graph to map the current tilt angle to the current screen display position over said modified contents view along said first direction.

28. A non-transitory computer readable storage medium encoded with a computer program, the program comprising instructions that when executed by one or more processors cause the one or more processors to perform operations comprising:

acquiring a contents view for an application executing on a mobile computing device;

magnifying, from the application, said contents view to exceed at least one of the horizontal and vertical dimensions of a screen display of said mobile computing device;

displaying a portion of said magnified contents view on said screen display;

generating one or more tilt signals indicative of one or more tilt angles along one or more scrolling directions of said mobile computing device;

detecting, from the application, a scrolling initiation and a scrolling termination commands;

for each said one or more scrolling directions, in response to detecting said scrolling initiation command:

selecting a reference baseline tilt corresponding to said scrolling direction;

determining a proportional relation corresponding to said scrolling direction, said corresponding proportional relation directly maps a predefined tilt rotation range onto a scrolling range that spans said magnified contents view from a first edge to an opposite edge along said scrolling direction; and initializing said corresponding proportional relation to map the current tilt angle along said scrolling direction to the current screen display position over said magnified contents view along said scrolling direction;

for each said one or more scrolling directions, subsequent to said initializing and prior to detecting said scrolling termination command:

scrolling said magnified contents view by placing said screen display at a position mapped by said corresponding proportional relation from the current relative tilt, wherein said current relative tilt is the difference between the current tilt angle of said mobile computing device along said scrolling direction and said corresponding reference baseline tilt; and updating, at a regular or irregular intervals, said corresponding reference baseline tilt when said mobile computing device is rotated beyond said predefined tilt rotation range.

29. The non-transitory computer readable storage medium of claim 28, wherein acquiring said contents view further comprising downloading said contents view from one or more servers accessed via an internet network connection.

30. The non-transitory computer readable storage medium of claim 28, wherein said contents view including one or more of an image, text, map, and a video to be displayed by said mobile computing device.

31. The non-transitory computer readable storage medium of claim 28, wherein said current relative tilt occurring when said screen display reaches an edge of said magnified contents view along said scrolling direction is recorded as an edge angle, and wherein said updating of said corresponding reference baseline tilt selects a new corresponding reference baseline tilt equal to the current tilt of said mobile computing device along said scrolling direction subtracted by said edge angle towards said corresponding reference baseline tilt.

32. The non-transitory computer readable storage medium of claim 31, wherein said edge angle is increased by a relatively small padding angle.

33. The non-transitory computer readable storage medium of claim 28, wherein the one or more scrolling directions include a first scrolling direction and a second scrolling direction, said first scrolling direction aligns with the horizontal direction of said magnified contents view and said second scrolling direction aligns with the vertical direction of said magnified contents view, the first and second scrolling directions being orthogonal.

\* \* \* \* \*